3,679,596
NUCLEAR REACTOR FUEL COMPOSITION
Howard W. Hill, Fremont, Alexis I. Kaznoff, Castro Valley, and Mickey O. Marlowe, Livermore, Calif., assignors to General Electric Company
No Drawing. Filed Aug. 30, 1968, Ser. No. 756,383
Int. Cl. C09k 3/00
U.S. Cl. 252—301.1 R                    6 Claims

ABSTRACT OF THE DISCLOSURE

The viscosity or creep resistance of oxide-type reactor fuels may be minimized by the addition of low viscosity materials which segregate to the fuel grain boundaries during reactor heat-up and operation. This minimizes the stress applied to the cladding due to mechanical interaction of the fuel and the clad during the reactor operation. Suitable materials include glass formers which may form glasses with the nuclear fuel material. The low viscosity material segregates to the fuel material grain boundaries resulting in a marked increase in the creep rate resulting from less restrained grain boundary sliding.

BACKGROUND OF THE INVENTION

Nuclear chain fission reactions and the reactors in which they take place are now well known. A typical reactor includes a chain reacting assembly or core made up of nuclear fuel material contained in fuel elements. The fuel material is generally encased in a corrosion-resistant heat conductive shell or cladding. The reactor core, made up of a plurality of these elements in spaced relationship, is enclosed in a container through which the reactor coolant flows. As the coolant passes between these spaced fuel elements, it is heated by energy given off during the fission reaction. The heated coolant then leaves the reactor, the heat energy is used to perform useful work and the now cooled coolant is recycled back to the reactor.

In a typical commercial power reactor, the nuclear fuel material is in the form of cylindrical pellets arranged in a column within the tubular clad member. The fuel is generally an oxide of the fissionable material which is generally uranium enriched in the uranium-235 isotope. In addition, the fuel may contain oxides of other fissionable and fertile elements such as plutonium and thorium. Also, small amounts of special purpose additives may be included such as gadolinium oxide as a burnable poison. The resulting fuel rods may have a length of over ten feet and a diameter of less than one-half inch.

During reactor operation, as the fissionable material is consumed and various fission products are produced, the fuel pellets increase in volume due to the increased volume of fission products and the fission product gases such as xenon and krypton which expand at the high reactor operating temperatures. This volumetric change within the fuel has caused a long standing problem in maintaining the integrity of the cladding in high temperature and irradiation environments. In these environments, the particles exhibit radial growth and develop large hoop stresses in the radial peripheral regions when they are restrained by the surrounding cladding which exhibits a smaller growth rate. Tensile hoop stresses develop in the cladding as a result of the differential radial growth in reaction to the compressive hoop stresses in the pellets. Large tensile hoop stresses in the cladding often result in its failure with consequential losses of fuel and fission products to the reactor coolant. The resulting contamination of the reactor coolant is highly hazardous and generally requires that the reactor be shut down and the defective fuel rods replaced.

Many attempts have been made to alleviate or overcome this problem. One approach is to simply increase the thickness of the cladding, thereby reducing the tensile hoop stress developed therein. This approach has other undesirable effects, however, inasmuch as it increases amount of parasitic neutron absorption in the fuel rod and decreases heat transfer from the rods to the reactor coolant by increasing the temperature drop across the cladding.

Often, an increased clearance between the fuel pellets and the cladding is provided to permit expansion in the pellet out of pressure contact with the cladding. Such clearances, however, substantially reduce heat transfer from the fuel rod by creating large temperature drops between the pellet and the cladding. These gaps will be especially large with new fuel rods. Near the end of the useful life of the fuel rod, when the pellet has grown to the point where it is in contact with the cladding, cladding rupture is especially likely since most cladding materials lose ductility with long term irradiation.

Attempts have been made to design fuel pellets to incorporate vacant space into which the pellet may grow. Typically, the fuel pellet may have axial grooves in the pellet surfaces, dished ends or axial holes therethrough. These spaces, however, decrease the quantity of fissionable material which may be included in a given fuel rod. Also, surface grooves, etc. may increase the chances of fuel pellet cracking during use. Since fuel pellet growth over long term irradiation is very slow, the expanding pellet material may flow into the vacant spaces plastically. However, the viscosity of the pellet material, even at high reactor operating temperatures, is so low that pellet cracking rather than flow is probable.

Where a fracture extends from the pellet center to the pellet surface, radiant heating along this gap may cause a hot spot on the cladding surface adjacent to the gap. This hot spot results from the fact that the cladding "sees" the very hot (about 5000° F.) pellet center down the gap. Also, when the pellet has become severely fractured, fragments may shift position. Thus, a small piece may become wedged against the clad during a reactor shutdown period or at low power operation. Then, when the reactor is returned to full power, thermal expansion within the pellet may press the fragment against the clad localizing stresses and causing the cladding to rupture.

Where the pellets crack in random manner, some of the cracks will be radial, that is, substantially parallel to the pellet surface. This will add a high thermal resistance to heat flow resulting in overheating and central melting of the pellet. In some instances, center melting of the fuel is undesirable since it may cause a change in the linear distribution of fuel atoms and in the dimensions of the fuel. The higher temperatures may also accelerate pellet growth and further fracturing.

It is therefore of utmost importance that further improvements be made in nuclear fuel materials and fuel rods to alleviate the problems caused by fuel pellet growth and fracturing during long term reactor operation.

SUMMARY OF THE INVENTION

It is, therefore, an object of this invention to provide an improved nuclear fuel composition overcoming the above-noted problems.

Another object of this invention is to provide a nuclear fuel material having improved plastic flow characteristics under nuclear reactor operating conditions.

Still another object of this invention is to provide a nuclear fuel composition having a longer useful life under nuclear reactor operating conditions.

The above objects, and others, are accomplished in accordance with this invention by incorporating in the nuclear fuel material a small amount of a material which segregates to the grain boundaries, forming low viscosity grain boundary phases to increase the plasticity of the fuel material at reactor operating temperatures. Typically, in a nuclear fuel comprising uranium dioxide and/or plutonium dioxide the addition of a small amount of at least one low viscosity material, such as a glass former which forms a glass having a high $UO_2$ and/or $PuO_2$ content, results in a marked increase in the creep rate of the material. While the phenomenon is not fully understood, it is thought that the added low viscosity material either precipitates directly at the grain boundaries or forms a glassy second phase at the grain boundaries, resulting in enhanced plasticity due to less restrained grain boundary slipping at reactor operating temperatures.

While for optimum improvements in fuel plasticity, it is preferred that the fuel be in the oxide form, the characteristics of other ceramic fuels, such as carbides, will be improved by the addition of suitable low viscosity materials.

Any suitable low viscosity materials may be added in a suitable amount. Typical low viscosity materials include glass formers such as silicon dioxide, phosphorous pentoxide, titanium dioxide, and mixtures thereof. While any suitable quantity of the glass former may be added, it is preferred that from about 0.01 to about 3 weight percent be added. Much less than this quantity tends to be less effective, while much more than this quantity adds an excessive amount of inert material in the fuel and occupies space which would be better occupied with fissile material. Within this range, optimum results are obtained with from about 0.01 to about 0.05 weight percent additive.

The second phase glass forming material may be added to the fuel material in any suitable manner. Typically, it may be incorporated into the fuel material by mechanical blending, coprecipitation, or introduction at any suitable point in the fuel manufacture process.

The fuel elements incorporating the low viscosity additive of this invention may have any suitable configuration. Typically, the material could be in the form of right cylindrical pellets or other geometrical shapes.

DETAILED DESCRIPTION OF THE INVENTION

Details of the invention will become further apparent upon reference to the following description of several preferred embodiments of the present invention.

EXAMPLE I

Several groups of fuel pellets are prepared as follows:
(a) A first group of pellets is fabricated by cold pressing the powder having an average diameter of about 1 micron and composed of uranium dioxide enriched to about 1.5% in the U-235 isotope and having an oxygen to metal atom ratio of about 2, then sintering the cold press preforms to a density of about 94% of maximum theoretical density,
(b) A second group of pellets is formed as described in paragraph (a) except that about 0.02% by weight silicon dioxide is blended with the powder before the cold pressing step,
(c) A third group of pellets is formed as described in paragraph (a) except that about 0.04 weight percent phosphorous pentoxide is blended with the $UO_2$ powder before the cold pressing step, and
(d) A fourth group of pellets is formed as described in paragraph (a) except that about 0.05 weight percent titanium dioxide is blended with the $UO_2$ powder before the cold pressing step.

All of the pellets have a right cylindrical shape, with dished ends as described in U.S. Pat. No. 3,365,371. The pellets are enclosed in conventional zirconium cladding, with about a 1 mil gap between the pellets and the inner wall of the cladding. The resulting fuel rods are inserted in a conventional power reactor as part of the core thereof.

All of the above fuel pellets are irradiated in the reactor at a neutron flux of about $2.5 \times 10^{-13}$ neutrons/cm.$^2$-sec. for about 3 years. The pellets are then removed from the reactor and examined. It is observed that the pellets of the first group are severely fractured, with major dimensional changes. The cladding is severely deformed adjacent those first unmodified pellets and adjacent the pellet-to-pellet interfaces. It appears that these pellets have expanded against the cladding with sufficient pressure to cause incipient, and in some cases actual, rupture of the cladding. The pellets from the second, third and fourth groups are found to be only slightly cracked with minor outer dimensional changes. Little deformation is seen in the cladding. It appears that these pellets expanded primarily into the dished end spaces.

EXAMPLE II

A powder containing about 2 weight percent $PuO_2$ and about 98 weight percent $UO_2$ is prepared by coprecipitation. A first group of dished fuel pellets is prepared from this powder by hot pressing as described in copending U.S. patent application Ser. No. 690,248, filed Dec. 13, 1967. Five additional groups of pellets are similarly prepared, except that $SiO_2$ is blended with the powder in the following proportions: (a) 0.01 weight percent $SiO_2$, (b) 0.03 weight percent $SiO_2$, (c) 0.08 weight percent $SiO_2$, (d) 0.02 weight percent $SiO_2$, and (e) 2.0 weight percent $SiO_2$.

All of the pellets are loaded into stainless steel fuel rods, with a gap of about 0.15 mil between the pellets and the inner wall of the cladding. The resulting fuel rods are then irradiated for about 4 years in a conventional nuclear power reactor at an average flux of about $2.5 \times 10^{13}$ neutrons/cm.$^2$-sec.

The pellets are then removed from the cladding and examined. Those pellets which did not include the $SiO_2$ additive are severely fractured and the cladding is severely deformed as a result of pellet expansion.

The pellets of groups (a)–(e) show less fracturing and less radial swelling. It appears that the fuel expanded primarily into the dished volume. The pellets of group (b) show the greatest coherency and the least pressure against the cladding. While the pellets with more than 0.03 weight percent $SiO_2$ show excellent physical characteristics, the added non-fissionable $SiO_2$ decreases slightly the energy output capability without significant improvement in plasticity over those containing 0.03 weight percent $SiO_2$. Thus, while more $SiO_2$ may be used, an optimum balance between energy capability and plasticity is obtained with about 0.03 weight percent $SiO_2$. Also, much higher proportions of $SiO_2$ will lower fuel melting temperature and thus lower the fuel operating power level where fuel melting is not permitted.

Although specific arrangements, compositions and proportions have been described in the above description of a preferred embodiment, other suitable compositions and components may be used an indicated above, with similar results. While very small amounts, considerably less than 200 parts per million, of various low viscosity materials may be present in conventional fuel materials as impurities, the presence at such low levels does not improve the plasticity of the fuel material.

Other modifications and ramifications of the present invention will occur to those skilled in the art upon reading the present disclosure. These are intended to be included within the scope of this invention.

We claim:
1. A method of increasing the plastic flow characteristics of a nuclear fuel material selected from the group consisting of oxides and carbides of uranium, plutonium and mixtures thereof comprising the step of disposing with the nuclear fuel material from about 0.01 to about 3.0 weight percent of a low viscosity ceramic material selected from the group consisting of silicon dioxide, phosphorus pentoxide, titanium dioxide and mixtures thereof which segregates to the grain boundaries of the nuclear fuel material at reactor operating temperatures.

2. The method of claim 1 wherein the nuclear fuel material is an oxide composition.

3. The method of claim 1 wherein the low viscosity ceramic material is silicon dioxide.

4. The method of claim 1 wherein the nuclear fuel material contains from about 0.01 to about 0.5 weight percent of the low viscosity ceramic material.

5. The method of claim 1 wherein the low viscosity ceramic material is phosphorus pentoxide.

6. The method of claim 1 wherein the low viscosity ceramic material in titanium dioxide.

References Cited

UNITED STATES PATENTS

| | | | |
|---|---|---|---|
| 3,278,655 | 10/1966 | Barr | 23—355 X |
| 3,344,080 | 9/1967 | Livey et al. | 252—301.1 |
| 3,344,081 | 9/1967 | Elyard et al. | 264—0.5 X |
| 3,374,178 | 3/1968 | May et al. | 252—301.1 |

OTHER REFERENCES

Amato et al.: Nuclear Science Abstracts, vol. 20, No. 8, p. 1636, Abs. No. 13297 (Apr. 30, 1966).

CARL D. QUARFORTH, Primary Examiner

R. L. TATE, Assistant Examiner

U.S. Cl. X.R.

23—355; 176—68, 89; 264—0.5

UNITED STATES PATENT OFFICE
CERTIFICATE OF CORRECTION

Patent No. 3,679,596            Dated July 25, 1972

Inventor(s) Howard W. Hill, Alexis I. Kaznoff, and Mickey O. Marlowe

It is certified that error appears in the above-identified patent and that said Letters Patent are hereby corrected as shown below:

Column 3, line 75, change "$2.5 \times 10^{-13}$" to read --$2.5 \times 10^{13}$--. Column 4, line 25, change "0.02" to read --0.2--; line 55, change "an" to read --as--. Column 5, line 6, change "0.5" to read --0.05--.

Signed and sealed this 20th day of March 1973.

(SEAL)
Attest:

EDWARD M. FLETCHER, JR.
Attesting Officer

ROBERT GOTTSCHALK
Commissioner of Patents